United States Patent [19]

Langerbeins et al.

[11] Patent Number: 5,225,456
[45] Date of Patent: Jul. 6, 1993

[54] AQUEOUS POLYACRYLATE DISPERSION FOR COATINGS

[75] Inventors: Klaus Langerbeins, Langen; Herbert Fink, Bickenbach; Karl-Josef Fölsch, Mainz; Horst Dinklage, Dieburg, all of Fed. Rep. of Germany

[73] Assignee: Rohm GmbH Chemische Fabrik, Darmstadt, Fed. Rep. of Germany

[21] Appl. No.: 469,323

[22] Filed: Jan. 24, 1990

[30] Foreign Application Priority Data

Jan. 28, 1989 [DE] Fed. Rep. of Germany ....... 3902557

[51] Int. Cl.$^5$ ............................................. C08G 83/00
[52] U.S. Cl. ...................................... 523/201; 524/457; 524/804; 524/812
[58] Field of Search ................. 524/812, 804, 457; 523/201

[56] References Cited

U.S. PATENT DOCUMENTS

| | | | |
|---|---|---|---|
| 3,047,548 | 7/1962 | Garrett | 524/812 |
| 3,308,081 | 3/1967 | Glabisch | 524/812 |
| 4,199,486 | 4/1980 | Boessler et al. | 523/201 |
| 4,468,498 | 8/1984 | Kowalski et al. | 523/201 |
| 4,499,212 | 2/1985 | Martino | 523/201 |

FOREIGN PATENT DOCUMENTS

| | | |
|---|---|---|
| 0020125 | 12/1980 | European Pat. Off. |
| 0115066 | 8/1984 | European Pat. Off. |
| 0018847 | 12/1988 | European Pat. Off. |

Primary Examiner—Paul R. Michl
Assistant Examiner—Edward Cain
Attorney, Agent, or Firm—Oblon, Spivak, McClelland, Maier & Neustadt

[57] ABSTRACT

Polyvinyl chloride surfaces receive a well-adhering, water and ethanol resistant coating with good plasticizer sealing effect by varnishing with an aqueous dispersion of (meth)acrylate polymers that are synthesized from 10 to 90% by weight acrylic and/or methacrylic acid alkyl or cycloalkyl esters with 1 to 10 carbon atoms in the ester group, 90 to 10% by weight acrylic and/or methacrylic acid esters with aromatic groups constituting or contained in the ester group, and small quantities of other monomers. The copolymers are preferably emulsion polymerized and may be synthesized as multiple-phase polymers according to the core-shell model.

8 Claims, No Drawings

AQUEOUS POLYACRYLATE DISPERSION FOR COATINGS

BACKGROUND OF THE INVENTION

1. Field of the Invention

The invention relates to an aqueous polyacrylate dispersion for the preparation of a coating to serve as a finishing varnish coat on a polyvinyl chloride article surface.

2. Discussion of the Background

After polyvinyl chloride (PVC) is made into semifinished or finished products, these objects are usually given an additional surface treatment. This surface treatment, which at its simplest may take the form of additional coating with a varnish, may be done both for decorative and functional reasons. For decorative effect, for example, the degree of luster of the surfaces of the PVC objects can be altered, and in the process the stability of the PVC against chemical and physical degradation can be improved.

Even in the case of synthetic leathers, which are essentially synthesized from fibrous materials and polymers as laminating raw materials, a significant portion is laminated with plasticized PVC. The surfaces of synthetic leather laminates are treated with a thin varnish, known as a finishing varnish.

In addition to the opportunity it affords to apply a decorative design with a look of leather and to impart the feel of leather, the finishing varnish coat also serves a protective sealing function that prevents exudation of plasticizers. This prevents the PVC surfaces from becoming brittle and sticky, and dirt from adhering to the surface.

For the finishing (surface) varnish coat, various polymers are in use that produce the desired properties to a greater or lesser degree. The varnishes are applied to the PVC surfaces as polymer solutions. In addition to polyurethanes and polyamides, hard polyacrylates, i.e. polymers with relatively high proportions of polymethyl methacrylate, which are known to make varnishes resistant to weather and by ethanol, are used as finishing varnishes. As adhesion enhancers for the polyacrylate coating on PVC surfaces, adhesion-enhancing substances such as vinyl chloride/vinyl acetate copolymers are added.

For considerations of environmental protection and work safety, attempts have been made to replace varnishes containing solvents with aqueous systems. For this purpose, aqueous dispersions of polyacrylates have been suggested, which may if necessary contain other, unsaturated additives, and which are then hardened to a coating by cross-linking after application at higher temperatures, if necessary (Ullmann, Encyklopadie der Technischen Chemie, 4th Ed., Vol. 15, pp. 163-170).

DE-C 25 59 790, for example, claims a printer's lake on an aqueous base for the preparation of gravure printing colors for plastic strips, particularly for PVC films, using bonding agents on a base of a mixture of a polyacrylic acid ester dispersion and a polymethacrylic acid ester dispersion in a ratio by weight between 100:4 and 100:8. The esters of the polyacrylic acid and the polymethacrylic acid are of the type whose ester groups are preferably composed of straight-chain, branched or cyclic alkyl groups with 1 to 8, and preferably 1 to 4 carbon atoms. Particularly good results are obtained with methyl and ethyl esters.

These properties of the bonding agent on a polyacrylic acid ester and polymethacrylic acid ester dispersion base are in some cases sufficient for gravure printing colors for PVC films, and commercially available dispersions prepared according to the specifications given in DE-C 25 59 790 are found to be usable for the preparation of firmly adhering and relatively hard PVC finishing varnishes with, in some cases sufficient plasticizer sealing effect, but they are not resistant to ethanol and/or water.

DE-A 31 12 704 discloses an aqueous dispersion or emulsion for the preparation of a firmly-adhering coating on PVC surfaces that contains an acrylate polymer with a film-forming temperature of above 60° C., at least one unsaturated polyester resin, 5 to 10% by weight methyl pyrrolidone and in some cases a melamine and/or urea-formaldehyde resin as well. This aqueous system must be hardened after application on the PVC surface by the addition of a cobalt accelerator and a water-soluble peroxide at a temperature of over 80° C., preferably over 100° C. The preferred suitable acrylate polymers are those that are prepared with methacrylic esters of lower aliphatic alcohols with from 1 to 3 carbon atoms and that are conventional and commercially available. For good adhesion of the coatings thus prepared onto PVC surfaces, the methyl pyrrolidone content is essential to the invention.

Because of the necessary hardening of the unsaturated polyester resin, which in itself makes the coating deficient in light-fast properties, the varnishing process is not simple. Problems arise both in terms of the shelf-life of such dispersions and in terms of the coatings because of their cross-linking. This makes it hard to varnish over them and prevents embossing of the finishing varnish because of a lack of themoplasticity.

DE-A 34 40 537 describes a process for coating plastic parts, particularly those made of hard PVC, that employs an aqueous dispersion of an aliphatic polyurethane with reactive carboxylic groups and a polyacrylate. Such polyurethane-containing systems yield coatings that are deficient in light-fastness and heat-resistance.

SUMMARY OF THE INVENTION

Accordingly, with a view to reducing environmental contamination from solvents, increasing safety and improving conditions in the workplace, one object of the present invention, in the context of the important field of applications for solvent-containing (meth)acrylate systems of PVC varnishing, is to provide aqueous (meth)acrylate systems that yield finishing varnishes with the required profile of properties. The properties required of a finishing varnish include good adhesion, plasticizer sealing effect, resistance to cracking, resistance to water and ethanol, light-fastness and heat-resistance.

This and other objects which will become apparent from the following specification have been achieved by the present aqueous dispersions of (meth)acrylate polymers used for preparing a finish coat on a polyvinyl chloride surface. The present aqueous disperions comprise a polymer which contains (i) 10–90 wt. % of one or more $C_{1-10}$ alkyl or cycloalkyl esters of (meth)acrylic acid, (ii) 90–10 wt. % of aromatic (meth)acrylic esters, (iii) 0–5 wt. % of copolymerizable carboxylic acids, and (iv) 0–20 wt. % of other copolymerizable monomers.

DETAILED DESCRIPTION OF THE PREFERRED EMBODIMENTS

Dispersions of (meth)acrylate polymers that are essentially obtained by emulsion polymerization of methacrylic acid esters and acrylic acid esters in which the ester group contains straight-chain or branched alkyl groups with 1 to 8, preferably 1 to 4 carbon atoms, particularly the methyl and ethyl esters, constitute the common, commercially available poly(meth)acrylate dispersions. Attempts to produce PVC finishing varnishes with given properties with dispersions of this kind surprisingly showed that the resulting coatings, in comparison with those prepared from solutions, did not display the requisite profile of properties in spite of having a structure identical or similar to corresponding monomers. Dispersion polymers with relatively high minimum film formation temperatures (MFT) produced virtually no films. Soft polymers used, i.e., polymers prepared with a large proportion of (meth)acrylate monomers with ester groups having long alkyl groups, e.g., $C_4$ to $C_8$ alkyl groups, yielded films that were adherent, but sticky and not alcohol-resistant.

Surprisingly, it has now been found that problems with aqueous PC finishing varnish are overcome with the present aqueous systems of dispersion polymers based on (meth)acrylates which are synthesized with higher proportions of (meth)acrylate esters in which the ester groups are or contain aromatic groups.

The invention thus relates to an aqueous dispersion of (meth)acrylate polymers for forming a finish coat on polyvinyl chloride surfaces by varnishing in which the (meth)acrylate polymers are copolymers derived from 10 to 90% by weight acrylic and/or methacrylic acid alkyl or cycloalkyl esters with 1 to 10 carbon atoms in the ester group; 90 to 10% by weight acrylic and/or methacrylic acid esters with aromatic groups constituting or contained in the ester group; 0 to 5% by weight polymerizable carboxylic acids; and which may have incorporated into them 0 to 20% by weight of other monomers.

The copolymers are preferably emulsion polymers and in particular are synthesized as multiple-phase polymers according to the core-shell model, for example.

Dispersions pursuant to the invention contain no organic solvents, are practically odorless and can be diluted with water. The coatings formed from these dispersions on PVC surfaces adhere well, are hard, resistant to cracking, water and ethanol-resistant and have a good plasticizer sealing effect, which makes them excellently suited, for example, for final varnish coats on soft PVC synthetic leathers. The dispersion is readily applied to the surfaces to be treated using conventional techniques, and there is no need for a special hardening reaction on the PVC surface in order to produce a varnish coat, whether clear or pigmented, with properties that meet prior art standards.

The (meth)acrylate polymers to be used pursuant to the invention are applied in aqueous dispersion form to the PVC surfaces of objects to be treated and to that end are prepared preferably by emulsion polymerization in an aqueous medium. In the dispersion pursuant to the invention (meth)acrylate polymers are used that have film-formation temperatures above 0° C., preferably in the range from 0° to 80° C. Film formation must take place at a temperature between 0° and 100° C. with or without auxiliary film-forming agents.

The polymer, essentially composed of aliphatic and aromatic esters of acrylic and/or methacrylic acid and hence hydrophobic, may, however, contain small quantities of less hydrophobic or even decidedly hydrophilic monomers as structural units. These hydrophilic monomers are polymerizable carboxylic acids, such as acrylic acid, methacrylic acid, and maleic acid or their anhydrides. They are incorporated into the dispersion polymer in quantities equal to about 0 to 5%, in particular 0.1 to 3% by weight.

Monomers with basic amino or amido groups, such as N,N-dimethylaminoethyl methacrylate or acrylic and methacrylic amides, which also contain alkyl, cycloalkyl or aryl groups in the amido group, or hydroxyl-containing monomers with hydrophilic alcohols in the ester group, such as 2-[2-(2-ethoxyethoxy)ethoxy]ethylmethacrylate, may be incorporated into the polymer in quantities equal to less than 10% by weight, preferably under 5% by weight down to 0% by weight. The incorporation of such polar monomers in small quantities has a positive effect on the stability of the polymer-containing dispersion by counteracting clumping. The long-term stability thus achieved is preferable for the shipment and storage of the (meth)acrylate polymer dispersions to be used pursuant to the invention.

Given the highly hydrophobic nature of the (meth)acrylate polymer, the present dispersions contain polymers prepared primarily or exclusively from esters of acrylic or methacrylic acid. In the preparation of the polymer, however, other, also substantially water-insoluble comonomers, such as styrene, alpha-methyl styrene, vinyl acetate, or more hydrophilic polymerizable compounds, such as N-vinyl imidazole and polymerizable ureido compounds may also be used in such proportions that the desired properties of the varnish on the PVC surface are maintained. In general, they are present in a proportion between 0 and 20% by weight, preferably between 0.1 and 10% by weight.

The (meth)acrylate polymers are primarily, i.e., in a proportion from 80 to 100% by weight, preferably from 85 to 99% by weight and especially from 90 to 98% by weight, synthesized from monomer esters of acrylic and/or methacrylic acid. The ester monomers are composed of 10 to 90% by weight, preferably 20 to 80% by weight, and especially 40 to 60% by weight of acrylic acid-and/or methacrylic acid alkyl or cycloalkyl esters with 1 to 10 carbon atoms, preferably with 1 to 6 carbon atoms, especially alkyl esters with 1 to 4 carbon atoms in the ester group, and 90 to 10% by weight *) of acrylic acid-and/or methacrylic acid esters with aromatic groups forming the ester group or with aromatic groups contained in the ester group. *L6 *) preferably 30 to 70% by weight, and especially 40 to 60% by weight Examples of the aliphatic or cycloaliphatic acrylic and methacrylic esters include methyl acrylate, ethyl acrylate, isopropyl acrylate, n-butyl acrylate, methyl methacrylate, ethyl methacrylate, n-butyl methacrylate, n-hexyl methacrylate, 2-ethylhexyl methacrylate, cyclohexyl methacrylate, 3,3,5-trimethylcyclohexyl methacrylate.

As the acrylic and methacrylic esters with aromatic groups as the ester group or containing aromatic groups in the ester group, the following may be used:

Compounds with the general formula:

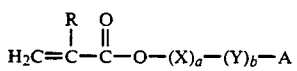

$$H_2C=\overset{R}{\underset{|}{C}}-\overset{O}{\underset{\|}{C}}-O-(X)_a-(Y)_b-A \quad (I)$$

where R is H or $CH_3$, X is $CH_2$, where a=0, 1, 2, 3, or 4, or X is a branched $C_3H_6$— or $C_4H_8$— group, where a=1, Y is O or NH, where b=0 or 1, and A is a $C_{6-10}$ aryl group or a $C_{1-4}$ alkylphenyl or naphthyl group.

Examples of compounds that correspond to general formula (I) include: phenyl acrylate, p-methylphenyl acrylate, phenyl methacrylate, p-methylphenyl methacrylate, 1-naphthyl methacrylate, benzyl methacrylate, 2-phenylethyl methacrylate, 3-phenyl-n-propyl acrylate, 2- phenoxyethyl methacrylate, and 2-phenyl-amino-ethyl methacrylate.

In a preferred embodiment of the invention, the aqueous dispersions of (meth)acrylate polymers are synthesized in multiple-phase according to the coreshell model. In the simpliest case, a polymer particle acting as a core is enveloped in another polymer material of a different composition offering certain advantages. It is known that such polymer structures can be produced particularly easily by emulsion polymerization (Journal of Polymer Science, vol. 22, 1365-1372, 1984). For this purpose, the aqueous polymer dispersions pursuant of the invention can be most advantageously prepared by polymerization of suitable monomers in aqueous emulsion, and in some cases in suspension according to relevant prior art processes (see H. Rauch-Puntigam, Th. Volker, "Acrylund Methacrylverbindungen,"*) Encyclopadie der Technischen Chemie, 4th Ed., Vol. 19, pp. 11-14 and 25-141, Verlag Chemie, 1980).

*) pp. 217-228, Springer Verlag Heidelberg, 1967; Ullamnn's

To achieve a multiple-phase synthesis of the dispersed polymer particles during emulsion polymerization, as is known, different monomer compositions are added successively to the same polymerization batch and polymerized in each case under the conditions of emulsion polymerization. The synthesis of the dispersed polymer particles of the invention for varnishing PVC surfaces can advantageously be carried out so that initially a core is first created with a high percentage, i.e., with more than 70% by weight and particularly with 90 to 99% by weight, of methyl methacrylate units, at which stage approximately 0 to 5% by weight of multifunctional (crosslinking) monomers, such as glycol dimethacrylate, butanediol-1,4-diacrylate, allyl methacrylate, and triallyl cyanurate, can also be.added and polymerized.

The multi-functional monomers serve to create a certain desirable crosslinkage of the core and create graft sites for attaching the polymer shell to the core. In the polymer shell or shells are preferably incorporated 60 to 100% by weight of the total acrylic and/or methacrylic esters with aromatic groups constituting or contained in the ester group in the core-shell polymer as a whole, in addition to other monomers, particularly acrylic and/or methacrylic acid alkyl esters with 1 to 10 carbon atoms in the alkyl group. The weight ratio of acrylic or methacrylic acid esters with aromatic groups constituting or contained in the ester group to acrylic or methacrylic acid alkyl esters is preferably in the range from 20:80 to 80:20.

The polymerizable carboxylic acids incorporated in the dispersion polymer in the amount of 0 to 5% by weight may be randomly distributed throughout the polymer or in the case of core-shell polymers may either be predominantly in the core or predominantly in the shell or shells or present more or less evenly or optionally unevenly throughout the core-shell phases.

Emulsion polymerization is carried out with the customary prior art non-ionic, cationic and anionic emulsifiers, such as alkali and ammonium salts of sulfated fatty alcohols, aromatic sulfonic acids or sulfonated ethylene oxide adducts.

Suitable anionic emulsifiers are, for example, sulfonated oxyethylated, alkylphenols, neutralized with alkali, which can be prepared, for example, from nonylphenol or triisobutylphenol adducts with 3 to 30 units of ethylene oxide per molecule.

The procedure may be performed by batch process or by a continuous process, such as the monomer addition process or the emulsion addition process. The emulsion addition process offers particular advantages. In this process, only a portion of the water phase, as a rule 10 to 70% of the total quantity, is placed in the polymerization vessel. In the remaining portion of the water phase, which generally contains a portion of the emulsifying agent, the monomer phases are emulsified under conditions under which no polymerization occurs, and these emulsions are successively added to the reaction vessel, where polymerization conditions prevail.

The process can be handled in a variety of ways. One can, for instance, allow the initiator or a portion of the emulsifier to flow in gradually or add it in batches separate from the monomer phases. For polymerization initiators, conventional alkali or ammonium peroxodisulfates are generally used, but in addition to or instead of them, other preferably water-soluble initiators, such as 4,4'-azobis-4,4'-dicyanovaleric acid, or redox systems, such as peroxosulfates, sulfoxy compounds and iron salts or hydrogen peroxide and iron (II) salts, may be used.

The latter are added separately from the monomer phase, since they will initiate polymerization at room temperature. The reaction temperature depends on the decomposition temperature of the initiator and lies in general between about 10° and 100° C.

Polymerization concentration in the dispersions upon preparation is in the range from 30 to 70% by weight solids, and the viscosity of the polymer dispersions is in general in the range from about 10 to 5,000 mPs (ISO 2555).

The size of the particles of the emulsion polymer should be within the range from about 50 to 600 nm, preferably in the range from 100 to 400 nm (ad determined by photon correlation spectroscopy, also known as auto-correlation spectroscopy, with the Nanosizer TDM made by Coulter Electronics, Ltd., Luton, Beds.).

The polymers generally have minimum film formation temperatures (MFT) in the range from 0° C. to about 100° C., preferably preferably from 30°-95° C., and particularly from 50°-90° C. (Ullmann, Encyklopadie der Technischen Chemie, 4th Ed., Vol. 19, pp. 17, 19 and 141; DIN 53 787).

In the varnishing procedure, the aqueous polymer dispersion is applied to the object with PVC surfaces to be protected. For this purpose it is advantageous to use polymer dispersions prepared by emulsion polymerization, after dilution with water if necessary. In order to improve adhesion of the finish coatings to the PVC surfaces, conventional N-methylpyrrolidone or a solvent with comparable properties may be applied with the polymer dispersion in quantities equal to from 2 to 20% by weight with reference to the quantity of polymer. These additives are also useful as wetting agents and promote film formation, particularly of polymers with a relatively high MFT.

The coating can be applied by conventional processes, such as dipping. spraying with a hand-manipulated spray gun or mechanically by roller application or ductor application or with processes typically used for final treatment of synthetic leathers, for example. (Ullmann, Encyklopadie der Technischen chemie, 4th Ed., Vol. 15, pp. 688–695 and pp. 168–169).

Obviously, numerous modifications and variations of the present invention are possible in light of the above teachings. It is therefore to be understood that within the scope of the appended claims, the invention may be practiced otherwise than as specifically described herein.

EXAMPLES

A. Preparation of the Dispersion

Example 1

In a 2 liter reaction vessel, equipped with a reflux condenser, stirring apparatus and addition vessel, 1.13 g triisobutylphenol polyglycol ether sulfate sodium salt (degree of ethoxylation=7) and 0.45 g ammonium peroxodisulfate were dissolved in 360 g of deionized water at 20° C.

To this solution was added at 80° C. with stirring an emulsion composed of:
630.0 g methyl methacrylate
270.0 g benzyl methacrylate
4.72 g triisobutylphenol polyglycol ether sulfate sodium salt
1 8 g ammonium peroxodisulfate and
550.0 g deionized water, within 3 hours.

After addition, the batch was cooled to room temperature. At 70° C., 0.38 g of 1,4-di-isopropyl benzene-hydroperoxide and 0.3 g of sodium hydroxymethyl sulfinate were added. The dispersion was then filtered. The pH of the approximately 50% dispersion was 2.2.

Example 2

The dispersion was prepared as in Example 1, the difference being that 2-phenoxyethyl methacrylate was used instead of benzyl methacrylate. The pH of the about 50% dispersion was 2.2.

Example 3

In a 2 liter reaction vessel, equipped with a reflux condenser, stirring apparatus and addition vessel, 1.49 g $C_{15}$-paraffin sulfonate sodium salt and 0.4 g ammonium peroxodisulfate were dissolved in 390 g of deionized $H_2O$ at 20° C.

To this solution, the following two emulsion additives were metered in successively with stirring at 80° C.

The addition of emulsion I, composed of:
243.0 g methyl methacrylate
2.52 g $C_{15}$-paraffin sulfonate sodium salt
0.37 g ammonium peroxodisulfate and
180.0 g deionized water,
was completed over 70 minutes. Immediately thereafter, over the next 170 minutes, Emulsion II, composed of:
266.5 g phenyl methacrylate
170.1 g ethyl acrylate
121.9 g methyl methacrylate
8.5 g methacrylic acid
5.9 g $C_{15}$-paraffin sulfonate sodium salt
0.85 g ammonium peroxodisulfate and
430.0 g deionized water, was metered in.

After addition, the batch was cooled to room temperature. At 70° C., 0.34 g of 1,4-di-isopropylbenzene-monohydroperoxide and 0.28 g of sodium hydroxymethyl sulfinate were added. The dispersion was then filtered. The pH of about 45% dispersion was 2.7.

Example 4

A dispersion was prepared as in Example 3 except that Emulsion I contains the following components:
239.4 g methyl methacrylate
3.6 g allyl methacrylate
2.52 g $C_{15}$-paraffin sulfonate sodium salt
0.37 g ammonium peroxodisulfate and
180.0 g deionized water.
The pH of about 45% dispersion was 2.7.

For use in the follow formulations, all dispersions were adjusted to a pH of 9 with an ammonia solution.

B. PVC Varnishing

The dispersions were diluted with tap water to a solids content of 30% and 10% N-methylpyrrolidone were added to improve wetting. Viscosity was increased by the addition of about 3% thickener dispersion of a polymethacrylic acid base (solid content 7.5%). With a spiral doctor (wire thickness 0.6 mm) the varnish resin dispersion was applied to a black, smooth synthetic PVC leather and dried in a circulating air drying chamber at 100° C. After being held 24 hours at room temperature, the sample was examined for the appearance and feel of the surface, plasticizer sealing effect, adhesion and resistance to ethanol and water.

| Dispersion Polymer Example | Surface after 1) | Assessment Block Point after 2) | Adhesion after 3) | Ethanol + Water Resistance after 4) | after 5) |
|---|---|---|---|---|---|
| 1 | non-tacky lustrous | 1 | 1 | good | good |
| 2 | non-tacky lustrous | 2 | 1–2 | good | good |
| 3 | non-tacky lustrous | 2 | 1–2 | good | good |
| 4 | non-tacky lustrous | 2 | 2 | good | good |
| Comparison with dispersion polymer of 100% polymethyl- | non-tacky lustrous | 2–3 | 2–3 | white spot | white |

| Dispersion Polymer Example | Surface after 1) | Assessment Block Point after 2) | Adhesion after 3) | Ethanol + Water Resistance after 4) | after 5) |
| --- | --- | --- | --- | --- | --- |
| methacrylate | | | | | |

Testing Methods:

1) Appearances and surface tackiness: visual inspection; surfaces pressed together at room temperature.
2) Block point (plasticizer sealing effect). Two test samples, 2.5 cm × 1 cm and 2.5 × 5 cm, were laid surface to surface, weighted down with a 1 kg weight and tempered for 1 hour in a circulating air drying chamber at 82° C. After that interval, the weight was removed from the sample and it was cooled 1 hour at room temperature. The samples were then carefully separated and the adhesion was graded.
Scale:
0 = samples remained separate
1 = no tackiness, samples separated immediately
2 = slight adhesion
3 = stronger adhesion, no alternations in surface, etc.
7 = completed adhered, samples could not be separated
3) Adhesion according to DIN 53 359 (permanent crack test). Sample A was tested according to DIN specifications at room temperature. After 1000 revolutions the break was assessed with the aid of a magnifying glass.
Scale:
0 = no change in the varnish
1 = slight fracture
2 = cracking
3 = white fracture
4 = varnish detached
4) Ethanol Resistance. 2 ml of ethanol (96.5%) were poured onto the varnished PVC surface and after being left for 30 minutes the treated spot was assessed.
5): Water Resistance. 2 ml distilled water were poured onto the varnished PVC surface and after being left for 24 hours the treated spot was assessed.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. An aqueous dispersion of a (meth)acrylate polymer for preparing a finish coat on a polyvinyl chloride surface, said polymer comprising:
   (i) 10-90 wt. % of $C_{1-10}$ alkyl or cycloalkyl esters of (meth)acrylic acid;
   (ii) 90-10 wt. % of aromatic (meth)acrylic esters of the formula (I)

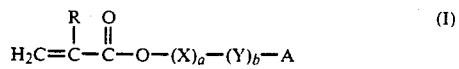

wherein R is H or $CH_3$,
   X is $CH_2$ and $a=0-4$, or a branched $C_3H_6$ or $C_4H_8$ and $a=1$,
   Y is O or HN and $b=0$ or 1, and
   A is phenyl, naphthyl or $C_{1-4}$ alkylphenyl;
   (iii) 0-5 wt. % copolymerizable carboxylic acids; and
   (iv) 0-20 wt. % other copolymerizable monomers selected from the group consisting of polar monomers containing amino, amido or hydroxyl groups; glycol dimethacrylate; butanediol-1,4-diacrylate; allyl methacrylate; triallyl cyanurate; styrene; α-methyl styrene; vinyl acetate and N-vinylimidazole;
   wherein said polymer comprises 80-100 wt. % of said esters of (meth)acrylic acid (i) and (ii), and
   said polymer having a film formation temperature of between 0 and 100° C.

2. The dispersion of claim 1, wherein said polymer comprises 85-99 wt. % of said esters of (meth)acrylic acid (i) and (ii).

3. The dispersions of claim 2, wherein said polymer comprises 90-98 wt. % of said esters of (meth)acrylic acid (i) and (ii).

4. The dispersion of claim 1, wherein said polymer comprises 0.1-3 wt % of said copolymerizable carboxylic acids selected from the group consisting of acrylic acid, methacrylic acid, maleic acid and maleic acid anydride.

5. The dispersion of claim 1, wherein said polymer is prepared by emulsion polymerization.

6. The dispersion of claim 5, wherein said polymer is a core-shell polymer.

7. The dispersion of claim 6, wherein the core of said core-shell polymer comprises more than 70 wt. % of methyl methacrylate monomer units and up to 5 wt. % of crosslinking monomer units selected from the group consisting of glycol dimethacrylate, butanediol-1,4-diacrylate, allyl methacrylate and tiallyl cyanurate.

8. The dispersion of claim 6, wherein said shell of said core-shell polymer comprises 60-100% by weight of the total of said aromatic (meth)acrylic esters in said core-shell particle.

* * * * *